United States Patent
Blanchard

(10) Patent No.: US 10,132,647 B2
(45) Date of Patent: Nov. 20, 2018

(54) METHODS AND APPARATUS FOR INCREASING ACCURACY AND RELIABILITY OF GYROSOPIC SENSORS

(71) Applicant: MTD Products, Inc., Valley City, OH (US)

(72) Inventor: Edward John Blanchard, Indianapolis, IN (US)

(73) Assignee: MTD Products Inc, Valley City, OH (US)

( * ) Notice: Subject to any disclaimer, the term of this patent is extended or adjusted under 35 U.S.C. 154(b) by 55 days.

(21) Appl. No.: 14/522,712

(22) Filed: Oct. 24, 2014

(65) Prior Publication Data

US 2015/0114082 A1    Apr. 30, 2015

Related U.S. Application Data

(60) Provisional application No. 61/894,981, filed on Oct. 24, 2013.

(51) Int. Cl.
*G01C 25/00*    (2006.01)
(52) U.S. Cl.
CPC ........... *G01C 25/005* (2013.01); *G01C 25/00* (2013.01)
(58) Field of Classification Search
CPC .................................................... G01C 25/005
See application file for complete search history.

(56) References Cited

U.S. PATENT DOCUMENTS

| 8,548,766 | B2 | 10/2013 | Judd | |
|---|---|---|---|---|
| 2008/0249732 | A1* | 10/2008 | Lee | G01C 19/42 702/96 |
| 2008/0319667 | A1* | 12/2008 | Hawkinson | G01C 25/005 701/507 |
| 2009/0093984 | A1* | 4/2009 | Choi | G01C 25/00 702/104 |
| 2011/0172820 | A1* | 7/2011 | Kim | G01C 19/5776 700/254 |
| 2012/0245850 | A1* | 9/2012 | Bang | E21B 47/022 702/9 |

* cited by examiner

*Primary Examiner* — R. A. Smith
*Assistant Examiner* — John M Royston
(74) *Attorney, Agent, or Firm* — Wegman, Hessler & Vanderburg

(57) ABSTRACT

The present disclosure describes systems and methods for maintaining gyroscopic sensor accuracy over time and across changing environmental conditions. In certain aspects, the present disclosure provides arrangements and methods for calibrating a gyroscope while it is positioned on a robotic platform. In particular, the gyroscope may positioned on a sensor platform that is moved through a series of known or measured rotations and then the gyroscope signals are compared to reference data and the sensor's gain and offset calculated. In other aspects, the present disclosure provides arrangements and methods for utilizing measurements from multiple gyroscopes that measure the same axis of rotation.

5 Claims, 3 Drawing Sheets

METHODS AND APPARATUS FOR INCREASING ACCURACY AND RELIABILITY OF GYROSOPIC SENSORS

CROSS REFERENCE TO RELATED APPLICATIONS

The present application claims priority to U.S. Provisional Application No. 61/894,981 filed Oct. 24, 2013, which is hereby incorporated by reference in its entirety to the extent not inconsistent.

FIELD OF THE INVENTION

The invention pertains generally to navigation systems comprising gyroscopes. More particularly, the invention pertains to navigation systems and methods for improving the accuracy of gyroscopes over their lifecycle for autonomous vehicles.

BACKGROUND

Gyroscopes are often used in navigation systems. For example, in inertial navigation systems, gyroscopes are used to determine the degree of rotation around a particular axis. The accuracy of gyroscopes, however, has been found to be affected by changes in age, temperature, shock, and other environmental factors. Therefore, frequent recalibration of the gyroscope or compensation methods may be necessary to maintain the desired accuracy of the navigation system over time.

Currently, navigation systems generally contain a singular gyroscope for cost, complexity, and other reasons. Performance of different gyroscopes varies over time depending on the operating conditions and brand of the gyroscope. Generally, higher quality gyroscopes that maintain high degrees of accuracy and precision over their lifecycle are more expensive than lower quality gyroscopes. Regardless of the brand of the gyroscope, recalibration of the gyroscope may be needed in order to compensate for inaccuracy in the gyroscope's readings to bring the gyroscope back into tolerance. Recalibration of gyroscopes is a costly endeavor as it requires the platform using the navigation system to be inoperable and generally requires the use of maintenance personnel.

When recalibration of a gyroscope is performed, the gyroscope is generally removed from the machine, positioned on a calibration assembly, and tested under a calibration procedure. In some instances, the gyroscope is transported to a laboratory or factory environment so that the gyroscope can be calibrated in a controlled environment. Alternatively, the gyroscope may be positioned on an in-field calibration tool. United States Patent Publication 2011/0066395 to Judd and titled Systems and Methods for Gyroscope Calibration discloses such a system in which a gyroscope can be removed from the machine and positioned on an in-field sensor platform having an accelerometer and a magnetometer. Judd states that the system determines a measured rotation based upon the rotation sensed by the gyroscope, derives a rotation based upon the changes in the earth's gravitational field sensed by the accelerometer, and derives a rotation based on changes in the earth's magnetic field sensed by the magnetometer, and then determines the compensation gain and compensation bias exhibited by the gyroscope based upon the actual rotation derived from the accelerometer and the magnetometer and the rotation measured by the gyroscope. However, there remains a need for alternatives to current calibration systems and methods, as they require human intervention and removal of the gyroscope, both of which lead to significant inefficiencies.

SUMMARY

The present disclosure provides for methods and systems to improve the accuracy and reliability of gyroscopes over their lifecycle. One aspect of the disclosure improves the accuracy of an inertial navigation system by using a plurality of gyroscopes having known error tendencies and a proportional compensation schema. Another aspect of the disclosure provides for economical and accurate in-system calibration of a gyroscope's gain and offset to maintain the sensor's accuracy over time and across changing environmental conditions such as temperature, vibration, or operating location.

In certain aspects, the present disclosure provides arrangements and methods for calibrating a gyroscope positioned on a robotic platform. In particular, the gyroscope may be moved through a series of known or measured rotations and then the measurements of the gyroscope are compared to reference data for a calculation of the bias and offset. In some arrangements, the present disclosure describes a robotic platform having a sensor platform with a gyroscope, the sensor platform capable of performing a controlled, known movement for gain and offset calibration of the gyroscope while coupled to the robotic platform.

The ability to recalibrate a sensor, such as a gyroscope, in-situ allows one to improve the accuracy of the sensor over its lifecycle without having to disassemble portions of the robotic platform or navigation system. Advantageously, this can reduce the cost and time necessary to calibrate the sensor, as compared to calibrations that require removal. Further, more frequent calibrations can be accomplished than previously would have been practical. Still further, calibrations can be triggered when likely needed, such as when environmental conditions dictate. Yet another distinct advantage of the system described herein is that it enables the use of less expensive components while maintaining an acceptable accuracy level, as the calibration frequency can easily be increased.

In certain other aspects, the present disclosure provides arrangements and methods for improving the accuracy of a navigational system by aggregating rotational measurements from multiple gyroscopes. Over the lifecycle of a gyroscope, the gyroscope can become less accurate depending on the robustness of the gyroscope and the environment that the gyroscope operates within. Temperature, for example, plays a large role in the accuracy of a gyroscope and many gyroscopes contain built in temperature compensation circuitry for this reason. Shock and vibration imparted to the gyroscope can also affect its accuracy.

All gyroscopes are not created equally. Some gyroscopes provide greater stability over their lifecycle depending on the design of the gyroscope or the level of rigor associated with the gyroscope testing. As should be evident, gyroscopes that are designed and/or tested to be more robust are generally more expensive than gyroscopes which are not as robust. Therefore, algorithms that can fuse the sensor readings from a plurality of gyroscopes can improve the accuracy and reliability of a navigation system over its lifecycle. Using multiple gyroscopes can improve the ability of the navigational system to calculate an accurate change in axial rotation by compensating for errors associated with particular gyroscopic sensors or by averaging errors across multiple gyroscopes. It has also been found that some gyroscopes provide more accurate readings as they age but are relatively more susceptible to shock and vibration environmental conditions. Still other gyroscopes are more tolerant of shock and vibration conditions, but provide less accurate readings as they age.

The ability to efficiently and accurately fuse the readings from multiple gyroscopes enables the navigational system to be more accurate over its lifecycle and require less calibration or other maintenance. The process used to fuse the readings can include proportional and statistical analyses in order to more accurately assess the true change in axial position of the navigation system depending on the types of sensors used, the sensor age, and/or environmental conditions.

As will be appreciated by those of ordinary skill in the art, the present invention may be used for a variety of applications. In particular, the present invention may be used improve the useful lifecycle and reduce maintenance time of a sensor, such as a gyroscope, used in the guidance of a robotic platform. For instance, the invention may be used on an autonomous mowing robot or cleaning robot (e.g., a vacuuming or floor scrubbing robot).

In many instances, it is desirable that an autonomous robot perform its function along a predetermined and/or calculated path. For instance, an autonomous robot may travel along a series of parallel straight line passes to completely traverse a defined area, such as when mowing a lawn. Such paths may be desired, as opposed to random and/or transverse directions, because these paths can allow for reduced time to cover a surface area and in addition can be more visually appealing, as compared to a random pattern.

In some applications, the present invention may be used with a gyroscope used to maintain straight lines and 180 degree turns for automated mowers and cleaners. The accuracy of the gyroscope has been found to impact the amount of overlap between passes required to reliably provide full coverage of the mowing/cleaning area, and unexpected accuracy errors in the gyroscope can cause curved lines and/or non-parallel passes, which may result in less than full coverage.

In still other applications, the navigational system is used for positioning of an autonomous robot platform as it is performing its designated task (i.e., mowing or washing). In these instances, accurate measurements of changes in rotation can be imperative for safe operation, especially if the device is operating in an unenclosed environment such as a field or golf course. In these instances, an invalid location of the robot can lead to trespass of property, the robot being incapacitated if it encounters water or other hazards, or possibly even safety concerns of the robot wanders into an area where there is pedestrian or automobile traffic.

It has also been found that the timing and frequency of gyroscope calibrations can be critical. As various environmental factors such as temperature can change the accuracy of a gyroscope, a calibration may be required before, during, and/or after operation of the robotic platform. In some instances, recalibration can be triggered by the expiration of a time period (e.g., 2 hours of operation and/or 24 hours of standby since the previous calibration). Alternatively or additionally, a significant change in the operating environment (e.g., temperature, shock, vibration, or humidity) or an observed change in performance by a second sensor (e.g., GPS) may be used to trigger a calibration. For example, a calibration may be triggered if the temperature changes by ±5° C. Alternatively or additionally, a calibration may be triggered if the path of the robotic platform measured by one or more sensors (e.g., GPS receiver) does not match the path measured by the gyroscopic sensor. For example, a GPS receiver may show that the robotic platform is or was traveling along a curved path but the gyroscope may show no rotation of the robotic platform. Alternatively, the path of the robotic platform as indicated as a function of the gyroscope may be compared to that determined by the use of a "buried wire."

Further forms, objects, features, aspects, benefits, advantages, and embodiments of the present invention will become apparent from a detailed description and drawings provided herewith.

DESCRIPTION OF THE ILLUSTRATED EMBODIMENTS

Figure 1:
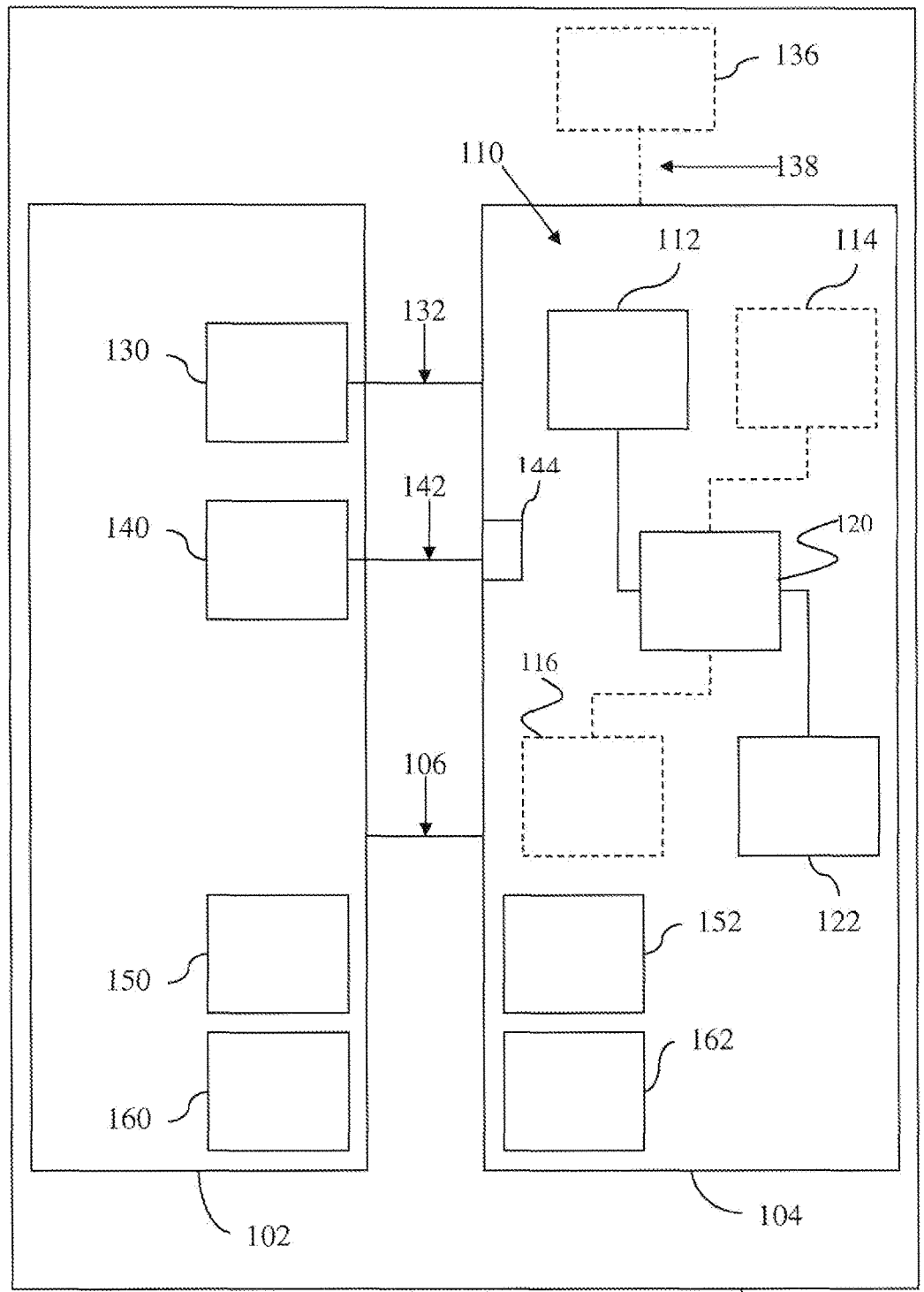
FIG. 1 is a schematic view of a robotic platform.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

The invention described herein provides for in-system calibration of a gyroscope's gain and offset. In certain aspects, the present disclosure provides arrangements and methods for calibrating a gyroscope positioned on an autonomous robotic platform. For example, the present invention may be incorporated into autonomous mowers and autonomous cleaners (e.g., vacuum cleaners); however, it is not intended for the present invention to be limited to such. Any reference to a specific robotic platform, such as an autonomous mower, is for simplicity and ease of understanding. It should be understood that the present disclosure is applicable to other platforms, including robotic and non-robotic platforms.

FIG. 1 illustrates a plan view of a robotic platform 100 comprising a frame 102 and a sensor platform 104 coupled to frame 102 by a coupler 106. Robotic platform 100 may comprise any one of a variety of autonomous robots such as, for example, autonomous mowing robots and autonomous cleaning robots. In many instances, robotic platform 100 comprises a power source and a driving mechanism arranged to move the robotic platform 100 in and/or around an area in a desired path.

Sensor platform 104 is configurable between a working configuration and a calibration configuration and supports one or more sensors 110 including but not limited to one or more gyroscopes 112. In the working configuration, sensor platform 104 is fixedly coupled to frame 102. In the calibration configuration, sensor platform 104 is pivotably coupled to frame 102 by coupler 106, such as a bearing track, a ball joint, or an axle. For example, sensor platform 104 may be rotatable around one or more imaginary geometric axes of coupler 106.

In some embodiments, sensors 110 positioned on sensor platform 104 include at least one sensor of another type, such as an accelerometer 114 and/or a magnetometer 116. Sensors 110, such as gyroscopes 112, accelerometers 114, and magnetometers 116, are directly or indirectly electrically connected to a processor 120 and memory 122. For example, sensors 110 can be electrically connected to processor 120 via a communication bus. Processor 120 and/or memory 122 are positioned on the robotic platform 100 and, in some instances, are positioned on sensor platform 104. Additionally, processor 120 and memory 122 may be any suitable processor and memory as will be appreciated by those of ordinary skill in the art. For example, the memory, such as memory 122, may comprise volatile (e.g., RAM) and/or non-volatile (e.g., ROM, flash, disk) types of memory.

Robotic platform 100 also comprises a manipulator 130 coupled to the sensor platform 104 by a coupler 132. Manipulator 130 and coupler 132 are arranged to move sensor platform 104 when sensor platform 104 is in the calibration configuration. For example, manipulator 130 and coupler 132 may rotate sensor platform 104 around an axis and relative to frame 102 of robotic platform 100. Advantageously, this arrangement can change the orientation of the sensors 110 on sensor platform 104 independently of frame 102. Preferably, manipulator 130 and coupler 132 are arranged to manipulate sensor platform 104 when robotic platform 100 is stationary so that the movement of sensors 110, such as gyroscopes 112, is isolated to only that caused by manipulator 130 and coupler 132.

As will be appreciated by those of ordinary skill the art, manipulator 130 and coupler 132 may comprise any combination capable of moving sensor platform 104. For example, manipulator 130 may comprise a motor and/or an actuator, such as a brushed or brushless motor (e.g., a stepper motor), a servo, and/or a solenoid or linear actuator, just to name a few non-limiting examples. Coupler 132 may comprise any means of coupling manipulator 130 with sensor platform 104. For example, coupler 132 may comprise a linkage such as a three or four bar linkage, a rotatable shaft, a chain, a belt, and/or a toothed gear arranged to rotate sensor platform 104 in one or more planes. Alternatively, manipulator 130 may be directly coupled to sensor platform 104.

Some manipulator 130 and coupler 132 arrangements are arranged to rotate sensor platform 104 in one plane; therefore, additional manipulators 136 and couplers 138 may be included in robotic platform 100 and arranged to rotate sensor platform 104 in a second plane that is transverse to the first plane. For example, manipulator 130 and coupler 132 may be arranged to rotate sensor platform 104 around an imaginary X axis while manipulator 136 and coupler 138 are arranged to rotate sensor platform 104 around an imaginary Y axis that is orthogonal to the X axis. Accordingly, one or more manipulators and couplers may be used to rotate sensor platform 104 in one or more planes so as to change the orientation of sensors 110, such as gyroscope 112.

In some embodiments, manipulator 130 and/or coupler 132 may be arranged and/or controlled so as to achieve a particular speed of sensor platform 103. This may be done for calibration accuracy. For example, the speeds of manipulator 130 and/or coupler 132 may be arranged to approximate the normal turning speed of the robotic platform 100, so as to calibrate under conditions similar to operation. Alternatively, speeds of manipulator 130 and/or coupler 132 may be arranged and/or controlled to rotate sensor platform 104 at speeds greater than or less than the normal turning speed of robotic platform 100 so as to achieve a desired calibration accuracy. In some instances, robotic platform 100 may comprise a spring and/or a damper arranged to control the rate of movement of sensor platform 104 by manipulator 130 and coupler 132.

In some embodiments, robotic platform 100 comprises a locking member 140 arranged to selectively lock the sensor platform 104 in the working configuration. For example, locking member 140 may lock the position of sensor platform 104 relative to the remainder of robotic platform 100 in the working configuration so that sensor platform 104 does not rotate relative to the robotic platform during working operation (e.g., mowing operations). This may be accomplished by, for example, advancing a pin 142 into an opening (e.g., a hole or slot) 144 defined by sensor platform 104 so as to prevent rotational movement of sensor platform 104 relative to other portions of robotic platform 100. Accordingly, locking member 140 is also arranged to unlock sensor platform 104 in the calibration configuration so that sensor platform 104 may pivot relative to frame 102. Locking member 140 may comprise a solenoid, a linear actuator, and/or a friction brake, just to name a few non-limiting examples.

In some arrangements, robotic platform 100 comprises stops 150 and 152 arranged to limit the rotational movement of sensor platform 104 relative to other portions of robotic platform 100. Stops 150 and 152 may be members of the robotic platform arranged to interfere with one another, such as by physical contact, so as to prevent rotation of sensor platform 104 in one or more directions. For example, stops 150 and 152 may comprise magnetic materials that attract or repel one another when in proximity. In one particular arrangement, stop 150 may magnetically attract stop 152 so as to pull sensor platform 104 into a predetermined orientation relative to a portion of robotic platform 100, such as frame 102.

Robotic platform 100 may also comprise a position sensor 160 arranged to measure absolute or incremental movements of sensor platform 104 relative to other portions of robotic platform 100, such as frame 102. For example, position sensor 160 may detect one or more position markers 162 positioned on sensor platform 104. As will be appreciated by those of ordinary skill in the art, position sensor 160 may comprise an optical, magnetic, inductive and/or capacitive sensor, and position marker 162 may comprise a corresponding reflector and/or interrupter, just to name a few non-limiting examples. In one particular embodiment, position sensor 160 comprises an optical beam emitter that emits an optical beam which is reflected and/or interrupted by position marker 162 before reaching an optical beam sensor of the position sensor 160. Alternatively or additionally, position sensor 160 may comprise a reed switch and/or a Hall effect sensor arranged to detect a magnetic field from a position marker 162 (e.g., a magnet attached to sensor platform 104).

While FIG. 1, corresponding to the above discussion, illustrates the manipulator, coupler, locking member, pin, stops, position sensor, and position marker as separate components on the robotic platform 100, a robotic platform of the present disclosure may include more or fewer than all or a subset of these components. Furthermore, two or more or all of these components may be combined into a single device. For example, a manipulator, such as a stepper motor, may also comprise or function as a locking member, a stop, and/or a position sensor.

While certain components may not be illustrated as being positioned on sensor platform 104, it is not intended for the present disclosure to be limited to such. For example, position sensor 160 and locking member 140 may be positioned on sensor platform with their corresponding components or features (e.g., position marker 162 and the slot for receiving pin 142) positioned on a different portion of robotic platform 100, such as frame 102. Similarly, components illustrated as being on frame 102 of robotic platform 100 are not limited to such. Components that interface with sensor platform 104 and/or features or components of sensor platform 104 may be coupled to any suitable portion of robotic platform 100.

Figure 2:
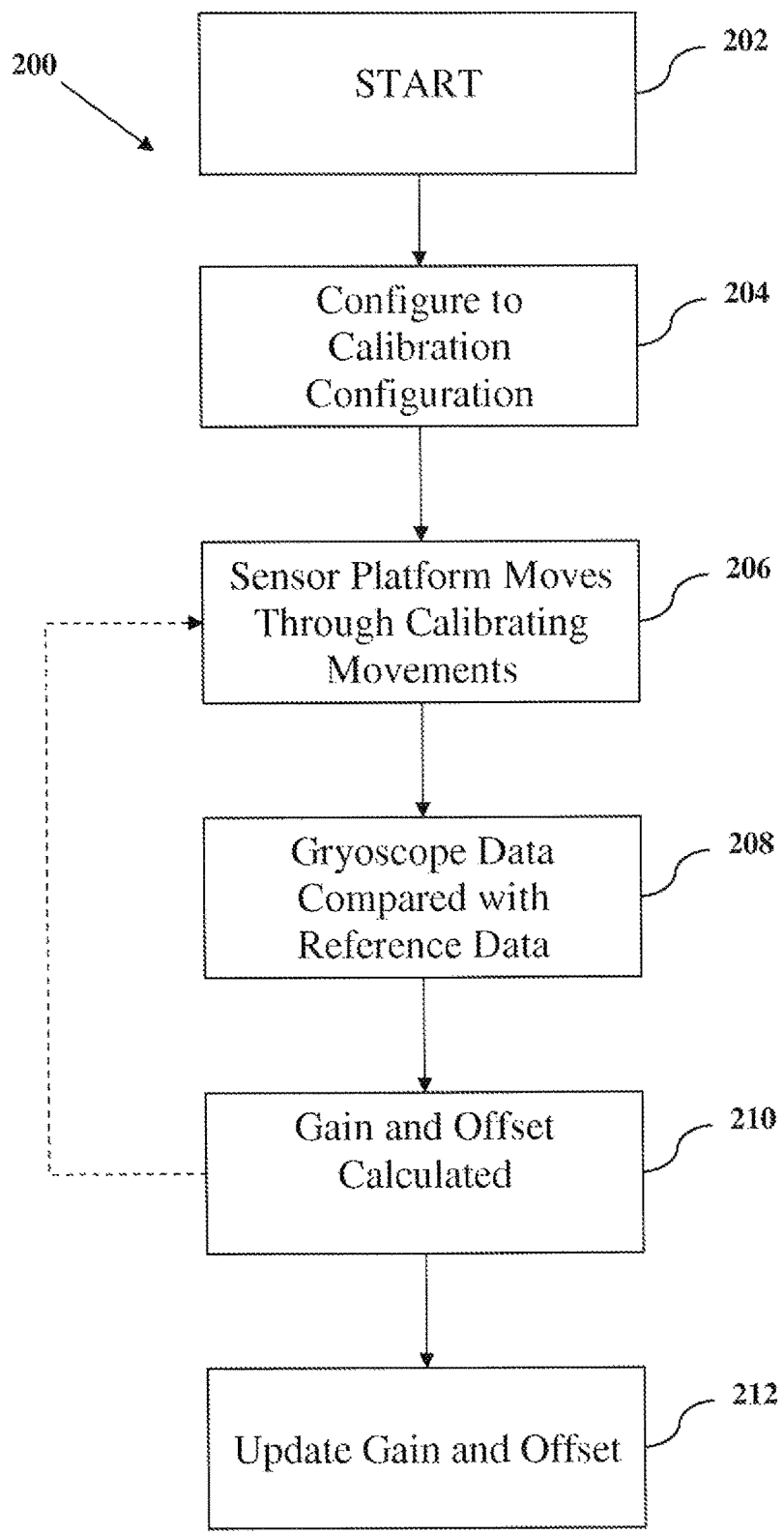
FIG. 2 is a flowchart illustrating a method of calibrating a gyroscope of the robotic platform of FIG. 1.

A method of calibrating a gyroscope on a robotic platform, such as that illustrated in FIG. 1, will now be described with reference to the flowchart 200 illustrated in FIG. 2. In initial stage 202, the calibration procedure is initiated by a calibration triggering event. As mentioned above, it has been found that the timing and frequency of gyroscope calibrations can be critical. As various environmental factors such as temperature can change the accuracy of a gyroscope, a calibration may be required before, during, and/or after operation of the robotic platform. In some instances, recalibration can be triggered by the expiration of a time period (e.g., 2 hours of operation and/or 24 hours of standby since the previous calibration). Alternatively or additionally, a change in the operating environment (e.g., temperature change) or an observed change in performance by a second sensor (e.g., GPS) may be used to trigger a calibration. For example, a calibration may be triggered if the temperature changes by ±5° C. Alternatively or additionally, a calibration may be triggered if the path of the robotic platform measured by one or more sensors (e.g., GPS receiver) does not match the path measured by the gyroscopic sensor. For example, a GPS receiver may show that the robotic platform is or was traveling along a curved path but the gyroscope may show no rotation of the robotic platform. Other events may also be used to trigger a calibration. For example, the detection of an impact and/or detection or calculation of an error of the robotic platform may initiate a calibration process for one or more gyroscopes of the robotic platform. Stage 202 may also include initial procedures for the calibration process, such as stopping the robotic platform and/or parking the robotic platform in a desired location (e.g., a recharging station) and/or orientation (e.g., level).

In stage 204, the sensor platform that supports the gyroscope is configured from a working configuration to a calibration configuration. As illustrated and described above with reference to FIG. 1, this may include movement of a locking member and/or pin, such as locking member 140 and/or pin 142, from a working condition to a calibration condition.

In stage 206, a manipulator and/or coupler moves the sensor platform through one or more known calibrating movements. For robotic platforms comprising more than one manipulator and/or coupler, the sequence of calibrating movements may include sequentially and/or simultaneously occurring rotations about different axes. In some instances, the calibrating movement includes rotation of a sensor platform until a stop of the sensor platform interacts with a stop of the frame so as to prevent further rotation of the sensor platform relative to the frame.

During stage 206, a signal from a gyroscope positioned on the platform is received by the processor and stored in memory as data in its original and/or modified form. In arrangements comprising more than one sensor on the sensor platform, such as another gyroscope, an accelerometer and/or a magnetometer, multiple signals may be received and stored simultaneously. Similarly, in arrangements comprising a position sensor, such as position sensor 160 capable of measuring absolute or incremental movements, signals from the position sensor can be received by the processor and stored in memory simultaneously with the receipt and storage of the other signal(s).

The calibrating movements may be a series of known, reference rotations, such as a rotation of known speed and/or degree around a particular axis. Alternatively, the calibrating movements may be a series of rotations of unknown speed and/or degree with the movements of the sensor platform being measured by a sensor separate from the one being calibrated, such as a position sensor.

In stage 208, stored data from the one or more gyroscopes is compared with stored reference data. In arrangements in which the sensor platform moves through a series of known rotations, stored reference data may be the output, theoretical or actual, of an accurate gyroscope that is moved through the same rotations. In arrangements in which the sensor platform moves through a series of unknown reference rotations, the stored reference data is the output from one or more sensors that measured the movement of the sensor platform relative to other portions of the robotic platform (e.g., the frame).

In stage 210, the processor calculates the gain and offset for calibrating a gyroscope positioned on the sensor platform from the comparison in stage 208. As will be appreciated by those of ordinary skill in the art, calculating the gain and offset for the gyroscope may be performed via linear regression. Additionally, in stage 210, the processor may perform an error calculation to determine the precision of the gyroscope and/or the sufficiency of the measured data for a calibration. For example, if stored data and/or the data from the comparison in stage 208 falls outside of a predetermined range, the processor may initiate additional calibration movements and/or perform additional calculations.

The calibration method concludes in stage 212 with the updating of the gain and offset in a position algorithm used to guide the robotic platform, such as guidance of the robotic platform during a mowing operation. Additionally, the sensor platform may be configured from the calibration configuration to the working configuration, and/or the robotic platform may continue the operation it was performing prior to the calibration (e.g., mowing or cleaning).

It should be appreciated that selected stages can occur multiple times or even simultaneously. For example, stages 206, 208, and 210 can be performed multiple times before stage 212. Also as examples, stages 202 and 204 can occur simultaneously, stages 206 and 208 can occur simultaneously; stages 208 and 210 can occur simultaneously; and stages 206, 208, and 210 can occur simultaneously, as well as other combinations. Portions of stages may also occur in an order or at a time different than that illustrated. For example, configuring the sensor platform from the calibration configuration into the working configuration may take place during stages 208 and/or 210.

Figure 3:
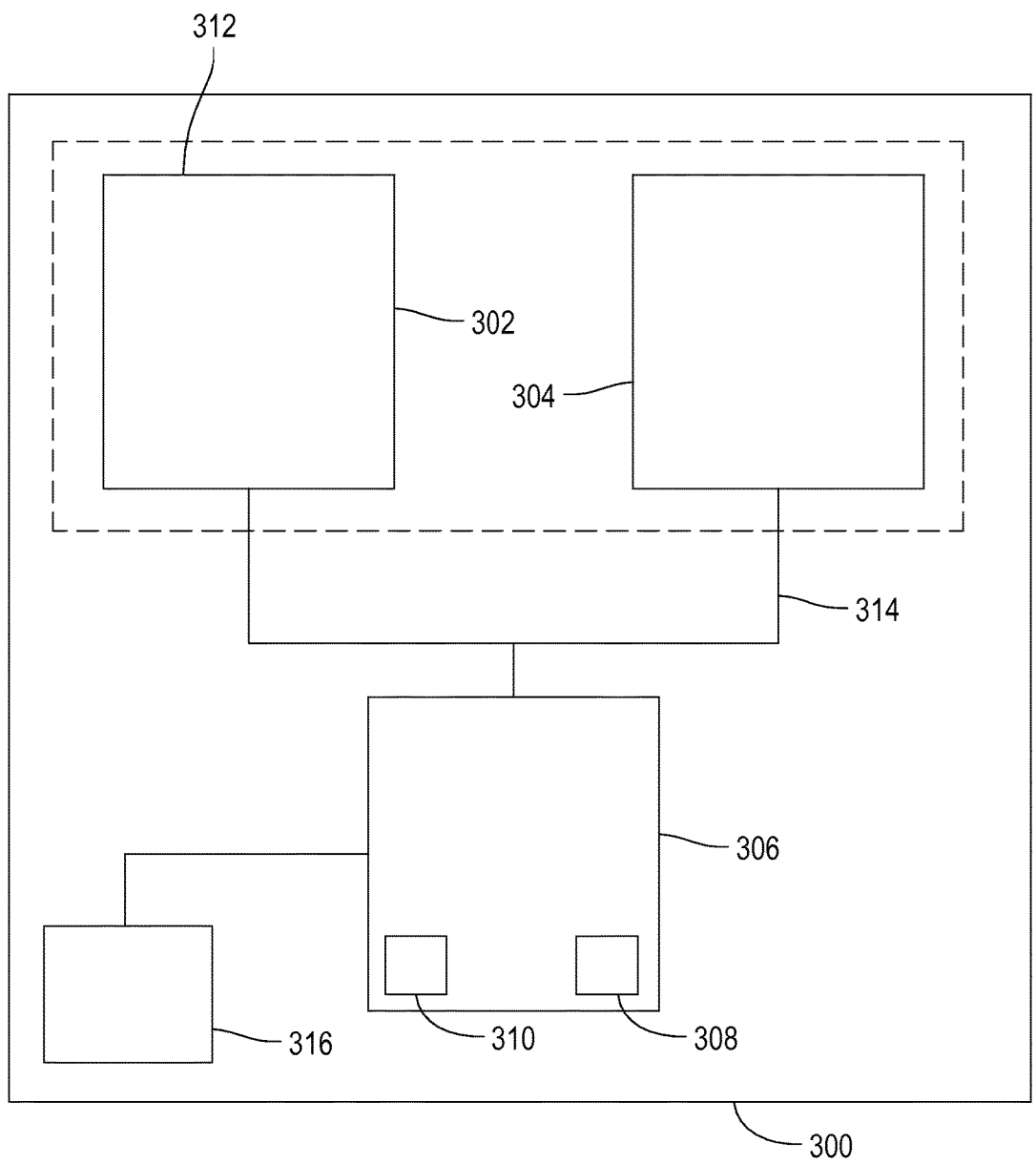
FIG. 3 is a schematic view of a navigational system that can be used with the robotic platform of FIG. 1.

FIG. 3 illustrates an aspect of the disclosure dealing with the sensor fusion of multiple gyroscopes. The system 300 illustrated can represent a base platform, for example an autonomous robot. The system includes multiple gyroscopes 302 and 304. Although two gyroscopes are illustrated, the system can include any number of gyroscopes. Additionally, the gyroscopes can each sense one to three axes of rotation. The gyroscopes 302 and 304 are electrically coupled to the processor 306 via interconnect 314. The processor 306 can include volatile or nonvolatile memory 308 or any number of logic cores 310. Alternatively, the processor can comprise other logic devices such as an FPGA, CPLD, ASIC, discrete logic or any combination of the previous.

Optionally a sensor platform 312 can be used such as the one described previously as 104. Additionally a sensor 316 other than a gyroscope can be used. It should be evident that many different schemas can be utilized to fuse the data from various sensors. For example, the processor can take into account the type of sensor, the age of the sensor, the brand of the sensor, or any combination.

For the case the different brands of gyroscopes are used, the algorithm can take into account desirable characteristics of each brand. It has been found that certain gyroscopes are less susceptible to gain and offset measurement drift over their life cycle. However, the sensitivity of these sensors has also been found to be impacted by environmental conditions especially shock and vibration. An example of such a sensor is the MAX21000 line of gyroscopes available from Maxim Integrated of San Jose, Calif. Alternatively, other brands of gyroscopes have been found to be less sensitive to environmental conditions of shock and vibration but more susceptible to drift over their life cycle. An example of such a gyroscope is the Murata SCR1100 provided by Murata Electronics North America of Smyrna, Ga. It should also be noted that the Murata gyroscopes are an order of magnitude more expensive than the Maxim gyroscopes.

Therefore it has been found beneficial to combine gyroscopes from different brands on the same platform in order to improve the ability of a navigational inertial system to detect changes in axial rotation over its life cycle. Depending on the accuracy of the brand of gyroscope, it is beneficial for the processor 306 to proportionally take into account the readings from the gyroscopes with a higher proportion being assigned to gyroscope(s) of higher accuracy given the current condition of the gyroscopes. By using inputs from multiple gyroscopes, an error from a singular gyroscope can be better accounted for such that the ultimate change in axial rotation determination is less affected by error.

Proportion adjustments can also be made depending on the age of the gyroscopes or the environmental conditions that the gyroscopes have been subjected to. For the example system illustrated in FIG. 3, if gyroscope 302 is of Murata brand and gyroscope 304 is of Maxim brand, it is beneficial for the processor 306 to assign more proportionality to the Maxim gyroscope over time if the gyroscopes are not subjected to excessive shock or vibration.

Optionally an additional environmental sensor can be used in place of sensor 316. The environmental sensor can be a shock, vibration, humidity, or other sensor. If such an environmental sensor is used, the processor 306 can alter the proportionality between the gyroscopes depending on the environmental conditions that the gyroscopes encounter. For example, if the gyroscopes encounter a large amount of shock and/or vibration during their operation, it is beneficial for the processor 306 to assign more proportionality to a gyroscope which is less susceptible to shock.

The sensor 316 can also comprise a magnetometer to measure the absolute orientation of a platform (312 or 300). In such a configuration, the processor 306 can use differences between measurements of the magnetometer to gauge the accuracy of the gyroscopes and assign proportionality accordingly.

Another aspect of this sensor fusion schema is that the processor 306 can utilize probability or error correcting algorithms. The processor 306 can also be configured to monitor the measurements from a gyroscope and apply statistical models to the readings to detect sensor drift or to update the amount of proportionality assigned to the sensor. Statistical analysis is also helpful for determining how the age of a sensor or how the environmental conditions imparted to a sensor effect its measurements. Furthermore, curve fitting such as regression analysis or error correcting algorithms such as least squares or fuzzy logic can be applied to sensor measurement data to account for errors in sensor readings which can come about from electrical noise or environmental conditions (such as proximity to a ferrous structure or contact with electrical or magnetic fields).

If used for controlling a robotic platform, the sensor fusion schema can be used in conjunction with a Bayesian filter to calculate the probability that the platform moved or rotated as suspected given the sensor readings. For example, the probability that the platform rotated around an axis given that the gyroscopic sensor measured the change in rotation can be adjusted using the schema, applying different weightings/probabilities for each gyroscopic sensor. If a different type of sensor is utilized (such as a shock sensor), the probability/weighting of the sensor(s) can likewise be adjusted.

While at least one embodiment has been illustrated and described in detail in the drawings and foregoing description, the same is to be considered as illustrative and not restrictive in character, it being understood that the preferred embodiment has been shown and described and that all changes, equivalents, and modifications that come within the spirit of the inventions defined by following claims are desired to be protected. It will be evident from the specification that aspects or features discussed in one context or embodiment will be applicable in other contexts or embodiments.

The invention claimed is:

1. A method for calibrating gyroscopic sensors in place comprising:
   rotating a gyroscopic sensor through a controlled range of rotation relative to an autonomous robotic base platform;
      wherein the gyroscopic sensor is secured by a rotatable coupling to the autonomous robotic base platform,
      wherein the autonomous robotic base platform has a driving mechanism and is capable of autonomously moving around an area in a defined path, and wherein the controlled range of rotation is either (i) predetermined or (ii) independently measurable using a non-gyroscopic sensor configured to measure the range of rotation, wherein the rotatable coupling is selectable between two states with one state being rotatable and the other state being non-rotatable;

receiving the range of rotation detected by gyroscopic sensor during said rotating;

calculating a calibration factor for the gyroscopic sensor using a processor based upon the measurement received from the gyroscope and either (i) a predetermined baseline value for the controlled range of rotation or (ii) the measurement of the controlled range of rotation provided by the non-gyroscopic sensor; and modifying, using the processor, the readings provided by the gyroscopic sensor based upon the calibration factor.

2. The method of claim 1 wherein the non-gyroscopic sensor is an optical sensor, proximity sensor, or encoder.

3. The method of claim 1 wherein the predetermined range of rotation is defined by a physical stop where a solid object prevents the rotation of the gyroscopic sensor via impact between the solid object and another solid object or a magnetic stop.

4. The method of claim 1 wherein the processor is physically mounted to the autonomous robotic base platform.

5. The method of claim 1 wherein the rotation of the gyroscopic sensor is actuated by an electric motor, solenoid, or linear actuator.

* * * * *